US008334421B1

(12) United States Patent
Gao et al.

(10) Patent No.: US 8,334,421 B1
(45) Date of Patent: Dec. 18, 2012

(54) METHOD OF MAKING NANOSTRUCTURED GLASS-CERAMIC WASTE FORMS

(75) Inventors: Huizhen Gao, Albuquerque, NM (US); Yifeng Wang, Albuquerque, NM (US); Mark A. Rodriguez, Albuquerque, NM (US); Denise N. Bencoe, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 315 days.

(21) Appl. No.: 12/495,851

(22) Filed: Jul. 1, 2009

(51) Int. Cl.
*G21F 9/00* (2006.01)
*G21F 9/16* (2006.01)
*C03B 5/00* (2006.01)
*C03B 5/027* (2006.01)

(52) U.S. Cl. ............... 588/11; 588/13; 588/14; 588/15; 588/400; 588/252

(58) Field of Classification Search .................. 588/1–4, 588/9–11, 13–16, 400, 252, 253
See application file for complete search history.

(56) References Cited

U.S. PATENT DOCUMENTS

| 6,329,563 | B1 * | 12/2001 | Cicero-Herman et al. | ...... 588/12 |
| 2008/0071129 | A1 * | 3/2008 | Yang et al. | ...................... 588/301 |
| 2008/0108495 | A1 * | 5/2008 | Tang et al. | ..................... 501/142 |

OTHER PUBLICATIONS

Balek et al. "Radiometric emanation method in characterization of inorganic sorbents used for treatment of gaseous and liquid radioactive waste" Nuclear Research Institute (1997) pp. 53-77.*
D. K. Peeler & T. B. Edwards, Impact of Redox on Glass Durability: The Glass Selection Process, WSRC-TR-2004-00135, Revision 0, Mar. 2004, Prepared for the Dept. of Energy under Contract No. DEAC09-96SR18500.
Steering Committee on Vitrification of Radioactive Wastes, Glass as a Waste Form and Vitrification Technology: Summary of an International Workshop, http://www.nap.edu/catalog/5488.html, (1996).
W.E. Daniel, AM/Cm Target Glass Durability Dependence on pH (U), WSRC-MS-96-0165 Rev 1, (1996).

* cited by examiner

*Primary Examiner* — Stanley Silverman
*Assistant Examiner* — Jennifer Smith
(74) *Attorney, Agent, or Firm* — Daniel J. Jenkins

(57) ABSTRACT

A method of rendering hazardous materials less dangerous comprising trapping the hazardous material in nanopores of a nanoporous composite material, reacting the trapped hazardous material to render it less volatile/soluble, sealing the trapped hazardous material, and vitrifying the nanoporous material containing the less volatile/soluble hazardous material.

20 Claims, 9 Drawing Sheets

METHOD OF MAKING NANOSTRUCTURED GLASS-CERAMIC WASTE FORMS

STATEMENT REGARDING FEDERALLY SPONSORED RESEARCH OR DEVELOPMENT

The Government has rights to this invention pursuant to Contract No. DE-AC04-94AL85000 awarded by the U.S. Department of Energy.

CROSS-REFERENCE TO RELATED APPLICATIONS

The present invention is related to U.S. patent application Ser. No. 12/127,111, entitled "Nanocomposite Materials as Getter and Waste Form for Radionuclides and Other Hazardous Materials", filed May 27, 2008, and that application is incorporated by reference herein.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods of disposal and isolation of hazardous wastes, particularly radionuclides.

2. Description of Related Art

One of the great concerns in nuclear energy development throughout the world is the safe disposal and isolation of spent fuels from reactors or waste streams from reprocessing plants. In particular, entrapment of highly volatile radionuclides such as iodine ($^{129}$I) produced from a fission process and subsequent immobilization of these radionuclides in an appropriate waste form is a great technical challenge because of the high mobility of these radionuclides and the difficulty of incorporating them into any existing waste forms such as glass, ceramics, and grout. Furthermore, a majority (>99%) of $^{129}$I will enter into the dissolver off-gas stream during fuel reprocessing. It is thus desirable to develop a material that can effectively entrap gaseous iodine during the off-gas treatment, which then can be directly converted into a durable waste form.

The present invention provides a new concept of applying nanomaterial and nanotechnology to radioactive waste treatment, especially, a method for converting the radioactive nuclide-loaded mesoporous material into a glass-ceramic waste form that can be used either for interim storage or long-term disposal. The invention first fixes iodine inside the nanopores of a getter material by converting molecular iodine into less volatile ionic species. It then vitrifies the nuclides-loaded getter material with additional glass-forming components or commercially available glass frits (e.g., those from Ferro Co.). Preferred compositions and vitrification temperatures (850 to 950° C.) have been established in terms of the durability of the resulting waste form. This has been accomplished by studying various material combinations, the routes for iodine fixation, and different vitrification temperatures. FTIR, EDXRF, high temperature XRD (HTXRD), TEM, XPS, and TGA/DTA have been employed to characterize nuclide behaviors and material structures. It has been found that the formation of nanometer crystalline phases is responsible for iodine immobilization and retention during vitrification and waste form leaching. This is consistent with the determined optimal vitrification temperatures, which are lower than conventional glass-forming temperatures.

BRIEF SUMMARY OF THE INVENTION

The present invention is of a method of rendering hazardous materials less dangerous, comprising: trapping the hazardous material in nanopores of a nanoporous composite material; reacting the trapped hazardous material to render it less volatile/soluble; sealing the trapped hazardous material; and vitrifying the nanoporous material containing the less volatile/soluble hazardous material. In the preferred embodiment, the nanoporous composite material comprises mesoporous alumina with pore sizes up to maximum of about 50 nm and/or derivatives of mesoporous alumina with pore sizes up to maximum of about 50 nm. The derivatives preferably comprise one or more oxides of transition metals selected from the group consisting of silver (Ag), copper (Cu), iron (Fe), nickel (Ni), zinc (Zn), cobalt (Co), zirconium (Zr), and bismuth (Bi). The nanoporous composite material preferably comprises one or more glass forming oxides, more preferably selected from the group consisting of $SiO_2$, $Na_2O$, $K_2O$, CaO, MgO, $B_2O_3$, $Li_2O$, and $P_2O_5$, and most preferably wherein the one or more glass forming oxides are in percentages by weight about 0-2% $Al_2O_3$, 12-15% $B_2O_3$, 7-9% $Li_2O$, 7-9% $Na_2O$, and 68-72% $SiO_2$. The hazardous material preferably comprises a radionuclide, more preferably one or multiple hazardous species in the form of gaseous or soluble ions, and most preferably one or both of 129I and $^{99}$Tc. The vitrifying step occurs at a temperature lower than 1100 degrees C., preferably between about 750 and 950 degrees C. (most preferably between about 800 and 900 degrees C.) or between about 850 and 950 degrees C. Leaching tests are conducted to choose optimal compositions of matter for durability of the vitrified materials. Compositions of matter that result in stable crystals are introduced, such as lithium oxide. Reacting comprises reacting the hazardous material with an alkaline reagent (most preferably alkaline metal hydroxide) and/or with sodium or potassium silicate. The invention is also of compositions of matter manufactured according to the above method.

The invention is also of a method of rendering hazardous materials less dangerous, comprising: trapping the hazardous material in nanopores of a nanoporous composite material; reacting the trapped hazardous material to render it less volatile/soluble; and sealing the trapped hazardous material; thereby creating a precursor for a subsequent vitrification process. In the preferred embodiment, the hazardous material comprises a radionuclide, more preferably one or multiple hazardous species in the form of gaseous or soluble ions, and most preferably one or both of 129I and 99Tc. Reacting comprises reacting the hazardous material with sodium or potassium silicate or with sodium or potassium hydroxide. This causes a phase change of the hazardous material, confines the hazardous material to nanopores, and reduces solubility of the hazardous material (by changing oxidative state of the hazardous material). Reacting causes one or more of: causing a phase change of the hazardous material, confining the hazardous material to nanopores, and reducing solubility of the hazardous material. Pore sealing reacts the hazardous material with sodium or potassium silicate.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 5(a) shows nanocrystals of an Al—Bi—Re embedded in silica matrix of the glass-ceramic waste form after vitrified at 900° C.; FIGS. 5(b) and (c) are, respectively, the electron diffraction pattern indicating the existence of nanocrystallites and EDS showing the embedded iodine in the matrix of Al—Si—O; Lithium is not shown due to lower atomic number; Cu signal is from sample; samples are vitrified at 900° C. grid;

DETAILED DESCRIPTION OF THE INVENTION

The present invention is of a method of making nanostructured glass-ceramic waste forms that can be used for disposition of various radionuclides, especially iodine, and of the resulting waste form. The method is based on the previous invention of using mesoporous alumina and its derivatives as getter materials for entrapping gaseous iodine (U.S. patent application Ser. No. 12/127,111). In the present invention, iodine sorbed on mesoporous material is first fixed with sodium silicate to convert molecular iodine into less volatile ionic species. The resulting material is then vitrified with additional glass-forming components so that iodine forms nanometer precipitates that are encapsulated in either a glass or a crystalline matrix. The loss of iodine, for example, during vitrification is minimal (~0%). The preferred vitrification temperature is about 850-950° C. This temperature is lower than that generally used for glass formation (higher than about 1100° C.). The method of the invention does not require using silver for immobilizing iodine, thus reducing the cost of waste form development as well as the potential environmental hazards related to waste form production disposal.

Figure 7:
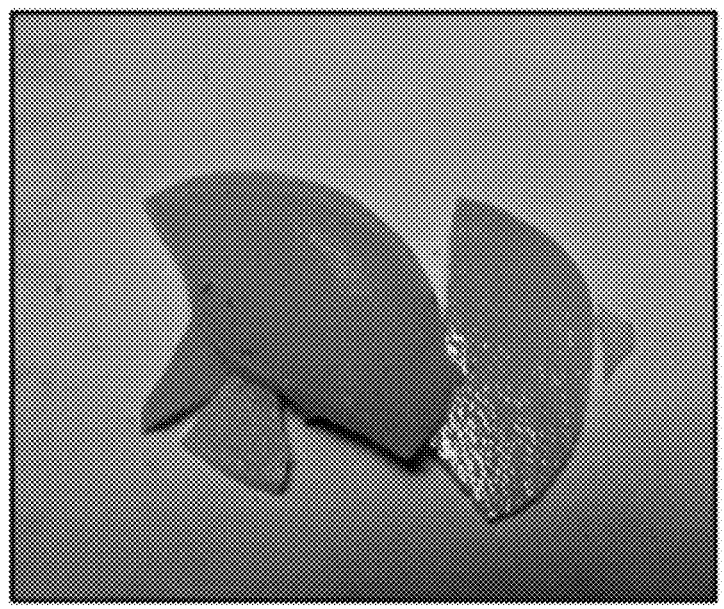
FIGS. 7 and 8 show rhenium (as a chemical analog to Tc) waste forms according to the invention without and with sodium silicate pretreatment.
Figure 8:
Figure 9:
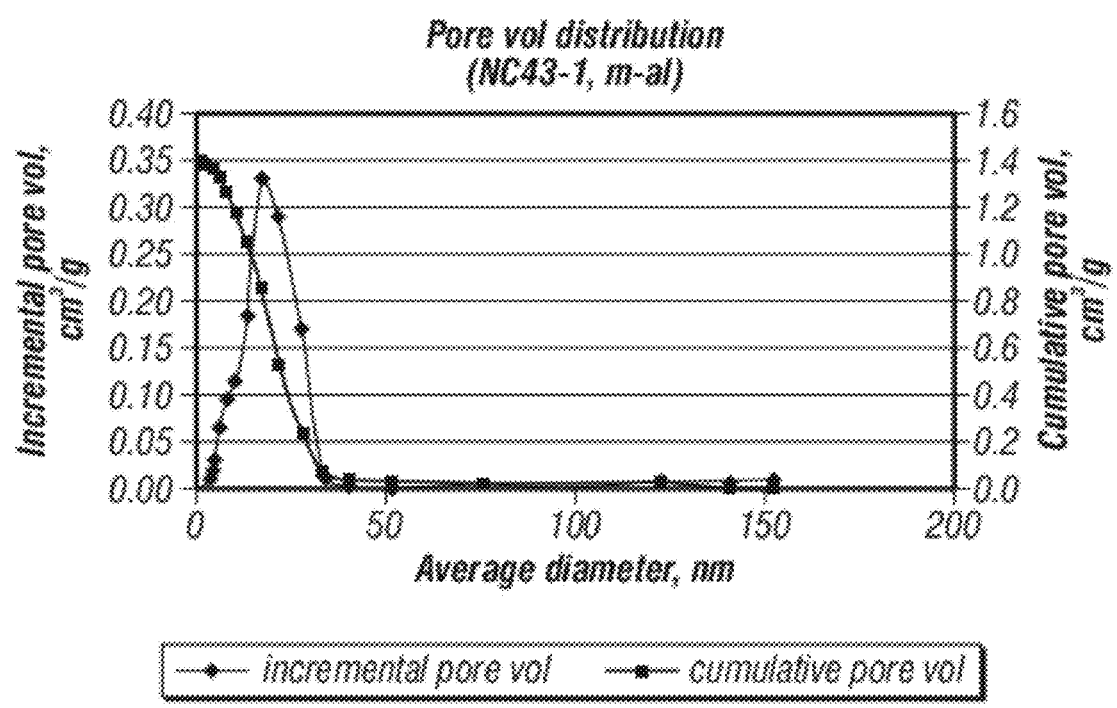
FIG. 9 shows pore size and volume distribution before fixation.
Figure 10:
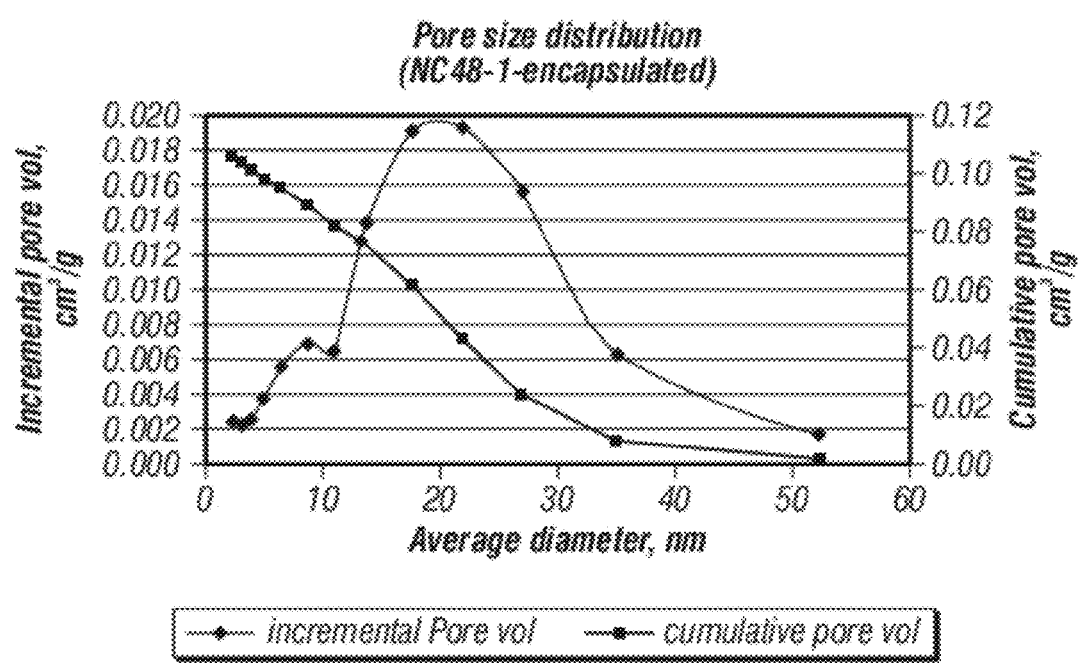
FIG. 10 shows pore size and volume distribution after fixation; >90% of nanopores are effectively sealed.
Figure 11:
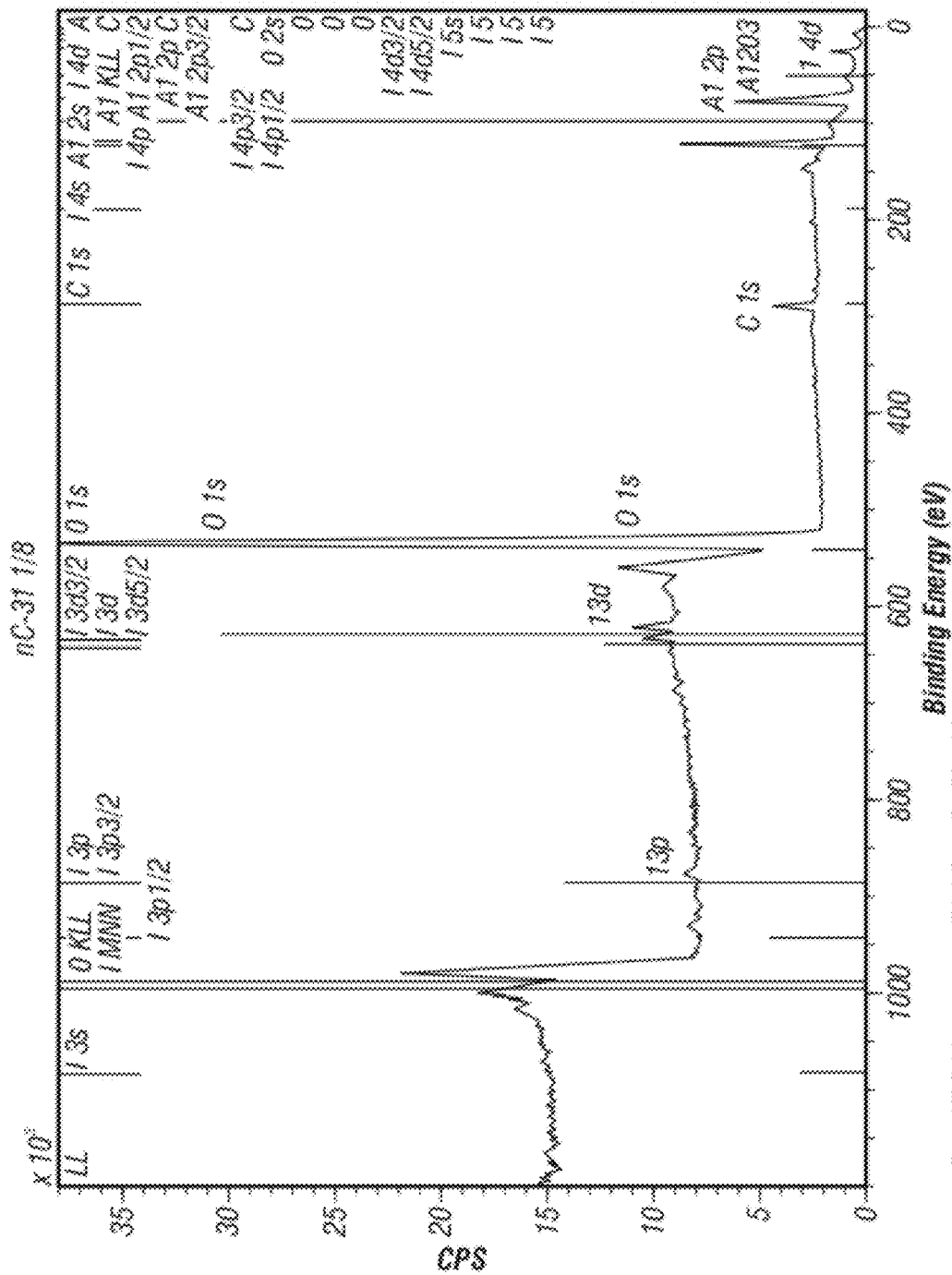
FIG. 11 shows XPS spectrum showing iodine binding energy.
Figure 12:
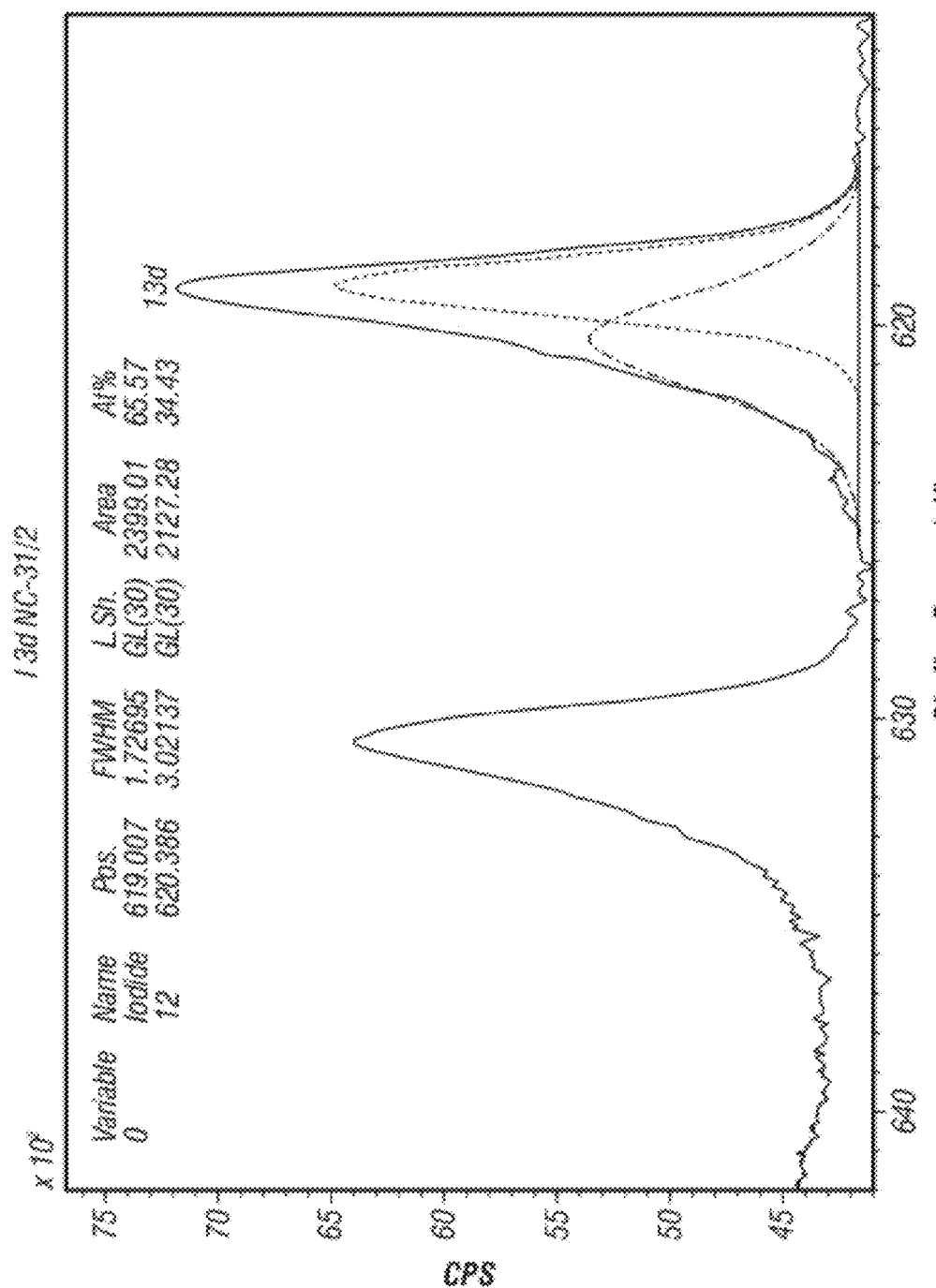
FIG. 12 is an XPS high resolution spectrum showing the composition of I(−1) and entrapped I(0) in the nanopores (the sample has been on shelf for 1.5 year at room temperature without vitrification).

Fixation of nuclide-loaded getter materials, e.g., iodine-loaded mesoporous alumina, form the precursors of the glass-ceramic waste form of the invention. During the fixation process, one reduces the mobility of radioactive nuclides. For examples, one thereby induces: a) phase change—gas phase iodine which adsorbs onto mesoporous alumina is transferred to ionic phase (iodide, or iodate); b) part of the iodine being confined in the nanopores due to the encapsulation in nanopores, which is shown by the dramatic reduction of pore size and volume after the fixation (see FIGS. 9-12); c) reduction of solubility of the nuclide via changing the oxidative state, e.g., Rhenium (Re-VII) to Rhenium dioxide (Re-IV). Re is used as the surrogate of technetium in regular laboratory study (see resulting waste forms of FIGS. 7 and 8). The fixation can be accomplished via metal complexation, reaction with alkaline metal hydroxide/salts, either in the form of solids or solutions, for example, sodium, potassium hydroxide and their silicates.

The invention is also of a method of making cost-effective nanostructured glass-ceramic as the waste form for deposition. The principle is to make the waste form both durable and low cost. To reach this goal, HTXRD (high temperature X-ray diffraction) is employed in parallel with leaching tests to optimize the vitrification condition for the most durable waste form. The combination result of HTXRD (FIG. 4(a)) and leaching tests (Table 1) show the optimum vitrification temperature to be between about 800 to 900 degrees C.

TABLE 1

| Sample ID | pH-end | Iodine loss, % | vitrification T, ° C. | [SiO$_2$], ppm | original composition | phase |
|---|---|---|---|---|---|---|
| | | | First leaching test (LA) | | | |
| LA-1 | 9.29 | 14.5 | 1100 | not analyzed | m-Al—I + Na4SiO4 + "510" | not analyzed |
| LA-2 | 9.50 | 27.4 | 1100 | not analyzed | m-Al—Ag—I + Na4SiO4 + "510" | not analyzed |
| LA-3 | 8.18 | 38.5 | 1100 | not analyzed | m-Al—I + Na4SiO4 + "XF140-2" | not analyzed |
| LA-4 | 8.22 | 33.3 | 1100 | not analyzed | m-Al—Ag—I + Na4SiO4 + "XF140-2" | not analyzed |

TABLE 1-continued

| Sample ID | pH-end | Iodine loss, % | vitrification T, °C | [SiO$_2$], ppm | original composition | phase |
|---|---|---|---|---|---|---|
| The following origin is m-Al—I/silver composite ||||||||
| LB-1 | 8.40 | 37.4 | 1100 | 44 | 3225 + NC52-2(vit), | amorphous to cristobalite |
| LB-2 | 8.39 | 19.6 | 1100 | 44 | CS749 + NC52-2(vit) | amorphous to cristobalite |
| LB-3 | 10.31 | 40.6 | 1100 | 717 | m-Al—I + Na4SiO4 | amorphous |
| LB-4 | 10.66 | 29.6 | 1100 | 664 | m-Al—I + Na4SiO4 | amorphous to cristobalite |
| LB-5 | 8.02 | 40.6 | 1100 | | m-Al—I + Na4SiO4 + SiO2 + B2O3 | Quartz |
| LB-6 | 8.28 | 15.9 | 1200 | 27 | m-Al—I + Na4SiO4 + SiO2 | Quartz & cristobalite |
| The following original m-Al—I samples do not contain silver ||||||||
| LC-1 | 10.30 | 5.8 | 750 | | 750 C. m-Al—I + Na4SiO4 + "510" frit | Quartz & cristobalite, Li$_2$Si$_2$O$_5$ |
| LC-2 | 10.12 | | | 1666 | 750 C. m-Al—I + Na4SiO4 + "510" frit | |
| LC-3 | 9.86 | 7.8 | 800 | 1034 | 800 C. m-Al—I + Na4SiO4 + "510" frit | Quartz & cristobalite |
| LC-4 | 9.89 | | | 1013 | 800 C. m-Al—I + Na4SiO4 + "510" frit | |
| LC-5 | 9.49 | 20.9 | 850 | 278 | 850 C. m-Al—I + Na4SiO4 + "510" frit | Quartz & cristobalite |
| LC-6 | 9.52 | | | 419 | 850 C. m-Al—I + Na4SiO4 + "510" frit | |
| LC-7 | 9.17 | 29.4 | 900 | 250 | 900 C. m-Al—I + Na4SiO4 + "510" frit | Cristobalite |
| LC-8 | 9.18 | | | 213 | 900 C. m-Al—I + Na4SiO4 + "510" frit | |
| The following original m-Al—I samples are fixed with potassium silicate ||||||||
| LD-1 | 9.96 | 0.0 | 750 | 1444 | 750 C. m-Al—I + Na4SiO4 + "510" frit | Quartz & cristobalite, Li$_2$Si$_2$O$_5$ |
| LD-2 | 10.02 | 0.0 | | 2145 | 750 C. m-Al—I + Na4SiO4 + "510" frit | |
| LD-3 | 9.74 | 0.0 | 800 | 987 | 800 C. m-Al—I + Na4SiO4 + "510" frit | Quartz & cristobalite |
| LD-4 | 9.52 | 0.0 | | 497 | 800 C. m-Al—I + Na4SiO4 + "510" frit | |
| LD-5 | 9.20 | 0.0 | 850 | 206 | 850 C. m-Al—I + Na4SiO4 + "510" frit | Quartz & cristobalite |
| LD-6 | 9.15 | 0.0 | | 174 | 850 C. m-Al—I + Na4SiO4 + "510" frit | |
| LD-7 | 8.68 | 13.5 | 900 | 279 | 900 C. m-Al—I + Na4SiO4 + "510" frit | Cristobalite |
| LD-8 | 8.94 | 7.6 | | 279 | 900 C. m-Al—I + Na4SiO4 + "510" frit | |

The preferred method to make a nanostructured glass-ceramic waste form according to the invention is described as follows:

Loading iodine on mesoporous alumina/composite. Mesoporous alumina is weighed into a Teflon jar, along with a vial which contains iodine weighed at the ratio of, preferably, about 1:10 (I/mesoporous alumina). The Teflon jar is screw-capped and set in the oven at about 90° C. for 6 hours. Then, the jar is opened in a hood and let cool to the room temperature.

Fixation of iodine loaded on alumina/composite. At about room temperature, about 3 g of iodine-loaded mesoporous alumina is ground-mixed with about 27 g of sodium silicate solution. The mixture is gradually dried at an increasing temperature from the room temperature to about 120° C. This dried mixture is referred to herein as the 'glass precursor'. The glass precursor is then ground and mixed with frits (e.g., Ferro Co. according to Table 1) or other glass forming components (e.g., silica (SiO$_2$)).

Vitrification: The mixture is heated in air to a selected temperature between about 750 and 1100° C. depending on the composition and test conditions.

Leaching test. The resulting glass-ceramic waste form is ground and sieved to about 250 μm (>90%). About 0.8 to 1 gram of the ground material is set in about a 50-mL buffer solution in a screw-capped plastic container, which is kept in a Teflon jar with about 20 mL of DI water. The screw-capped Teflon jar is set in the oven for about 7 days at about 90° C. At the conclusion of each leaching test, the liquid suspension is filtered with filter paper. The filtrate is saved for further analyses. The residual leached glass is dried overnight and then subjected to EDXRF analysis for iodine concentrations. These concentrations are then compared with the glass prior to the leaching test to determine the percentage of iodine loss from waste form during leaching. The filtrate is analyzed for its pH and silica concentration.

Figure 1:
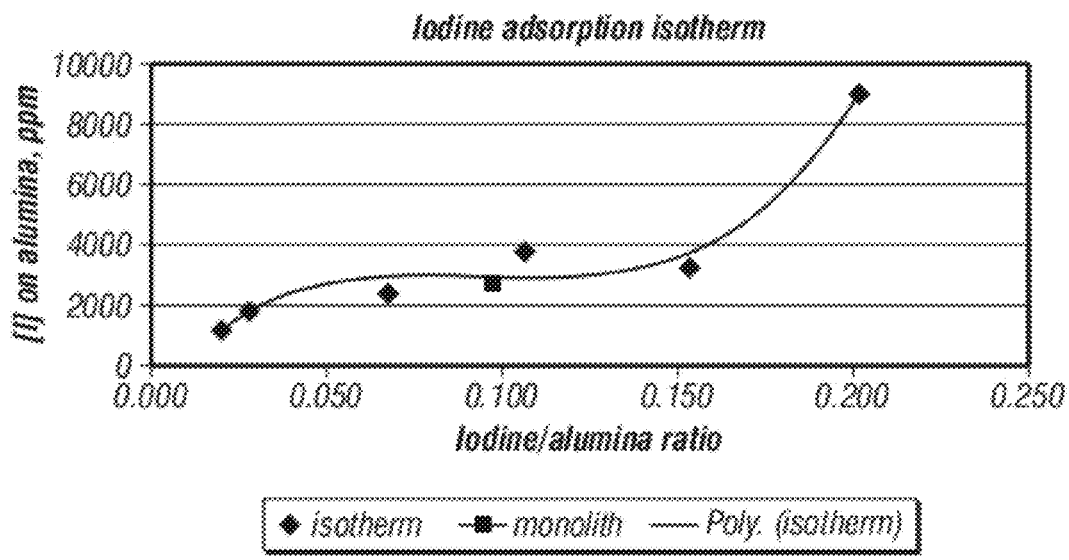
FIG. 1 is a graph of iodine adsorption isotherm of mesoporous alumina; measurements were made after overnight desorption at 90° C. following adsorption.

Iodine loading on mesoporous alumina composites. Iodine loadings of the waste forms are given in Table 2. The adsorption capacity of the getter materials is shown in FIG. 1 and Table 3. Data in FIG. 1 were obtained from exhaustion experiments, in which the iodine-loaded material was heated overnight at about 90° C. and cooled to about room temperature in an open jar. The data tabulated in Table 3 are obtained from the sorption experiments without subsequent overnight desorption at about 90° C. Note in Table 3 that monolithic mesoporous alumina (NC71) with no silver included exhibits higher iodine sorption capability than the material with silver, indicating that silver may not be necessary for iodine sorption.

TABLE 2

Iodine loadings on glass-ceramic materials

| Glass sample | [I] in the ceramic-glass, ppm | [I], normalized to per g of mesoporous alumina, ppm | vitrification temperature, °C | iodine loss % during vitrification* |
|---|---|---|---|---|
| NC48-1 + "510" | 429 | 7064 | 1100 | 32 |
| NC48-2 + "510" | 915 | 15067 | 1100 | 0 |
| NC48-1 + "XF140-2" | 698 | 11494 | 1100 | 0 |
| NC48-2 + "XF140-2" | 1069 | 17603 | 1100 | 0 |
| NC52-2 + "3225" | 617 | 9872 | 1100 | 5 |
| NC52-2 + "CS749" | 570 | 9120 | 1100 | 12 |
| NC67-7 | 748 | 11968 | 1200 | 0 |
| NC67-6 | 243 | 3880 | 1100 | 63 |
| iso-750 | 855 | 13680 | 750 | 0 |
| ios-800 | 649 | 10384 | 800 | 0 |
| iso-850 | 659 | 10544 | 850 | 0 |
| iso-900 | 706 | 11296 | 900 | 0 |

*Non-zero numbers are due to the heterogeneity of samples.

TABLE 3

Iodine adsorption on mesoporous alumina/mesoporous aluminum-silver composites

| Sample ID | I/(m-Al) ratio | Sample wt, g | [I] on mesoporous alumina, ppm |
|---|---|---|---|
| NC72 (w/ silver) | 0.114 | 0.2036 | 35674 |
| NC71 (monolith) | 0.107 | 0.2035 | 66245 |

BET data of these two materials

| Sample ID | Surface area, m³/g | Pore vol. cm³/g | Average pore size, nm | Micropore vol. cm³/g |
|---|---|---|---|---|
| NC72 (w/ silver) | 215 | 0.706 | 12.7 | 0.006644 |
| NC71 (monolith) | 354 | 1.75 | 19.15 | 0.014549 |

Figure 2:
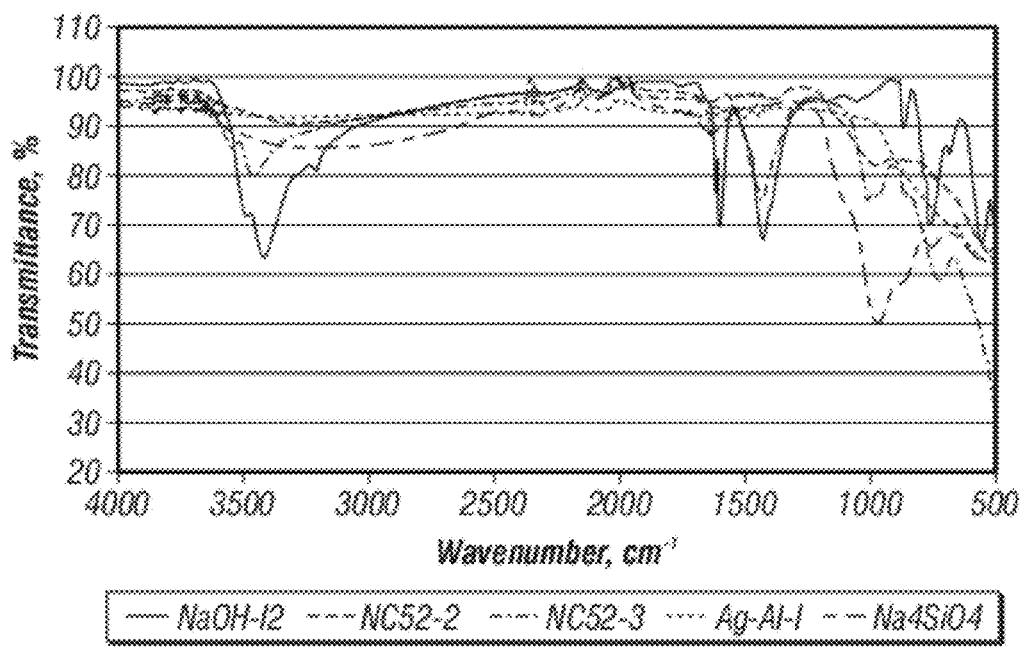
FIG. 2 shows FTIR spectra of iodine in different materials/compounds; molecular iodine was converted into ionic species after fixation.
Figure 3A:
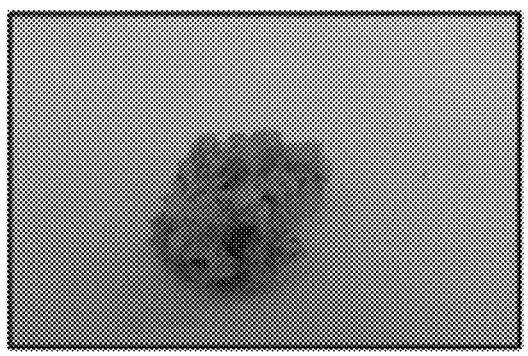
FIGS. 3(a)-3(d) illustrate morphology of glass-ceramic waste forms made, according to the invention; with increased sintering temperature, the color of the resulting material changes from brown to pale white; the size of vesicles also appears to increase.
Figure 3B:
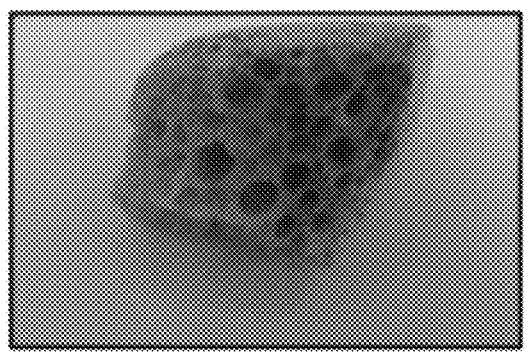
Figure 3C:
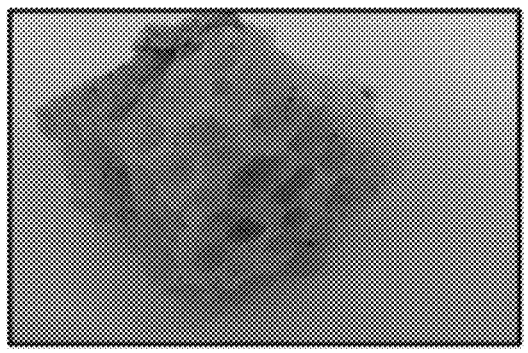
Figure 3D:
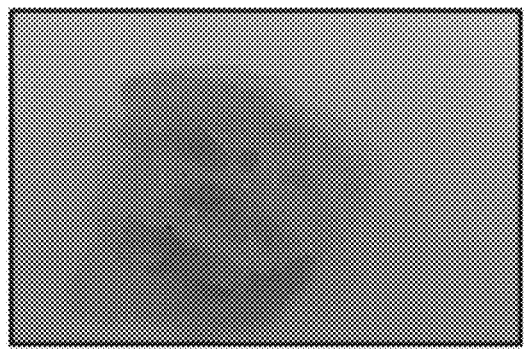

Fixation of Iodine with Sodium Silicate. During the fixation the form of the iodine in the mesoporous alumina is changed from gas to ionic species, as indicated by FTIR spectra (FIG. 2). In FIG. 2, NaOH-12 stands for iodine which has reacted with sodium hydroxide solution. NC52-2 is the product of mesoporous aluminum-silver composite fixed with sodium silicate (the glass precursor). NC52-3 is an iodine loaded mesoporous aluminum-silver composite reacted with sodium hydroxide solution, with no silica involved. The spectrum labeled as Ag—Al—I stands for iodine-loaded mesoporous aluminum-silver composite (before fixation by sodium silicate). Finally, the spectrum labeled as $Na_4SiO_4$ is sodium silicate. All the compounds or materials analyzed are dried solids. The iodine in sample NaOH—$I_2$ is expected to consist of iodide [I(−1)) and iodate (I(+5)) forms due to the following reaction:

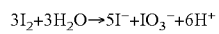

$$3I_2 + 3H_2O \rightarrow 5I^- + IO_3^- + 6H^+$$

Although no detailed peak analysis has been performed, it is obvious that the spectra of Na OH—$I_2$ and NC52-3 have overlaps around wavenumbers of 1440 and 790 cm⁻1, whereas, the spectrum of sample Ag—Al—I does not show any specific peak at these positions. Therefore, the iodine form in initial mesoporous material is different from that in the fixed materials. Because of this change of iodine into less volatile forms, the iodine loss during vitrification is minimal (~0%).

Leaching test. The final leachate solutions were subjected to silica concentration analysis (HACH silica method DR/2400 (8185) for high concentration of 1.0 to 100.0 mg/L). The dissolved silica concentrations, pH, and the loss of iodine during leaching are shown in Table 1. Among the glass frits tested and other formulations tried, the Frit 510 mixture resulted in the least iodine loss during leaching tests. Frit 510 comprises 0-2% $Al_2O_3$, 12-15% $B_2O_3$, 7-9% $Li_2O$, 7-9% $Na_2O$, and 68-72% $SiO_2$. Therefore, a preferred frit composition for encapsulation of iodine is recommended to be similar to that of Frit 510. The vitrification temperature can also affect waste form performance. The study shows that lower iodine loss due to leaching is observed for the waste form vitrified at lower temperatures in the range of about 750 to 900° C.

Figure 4A:
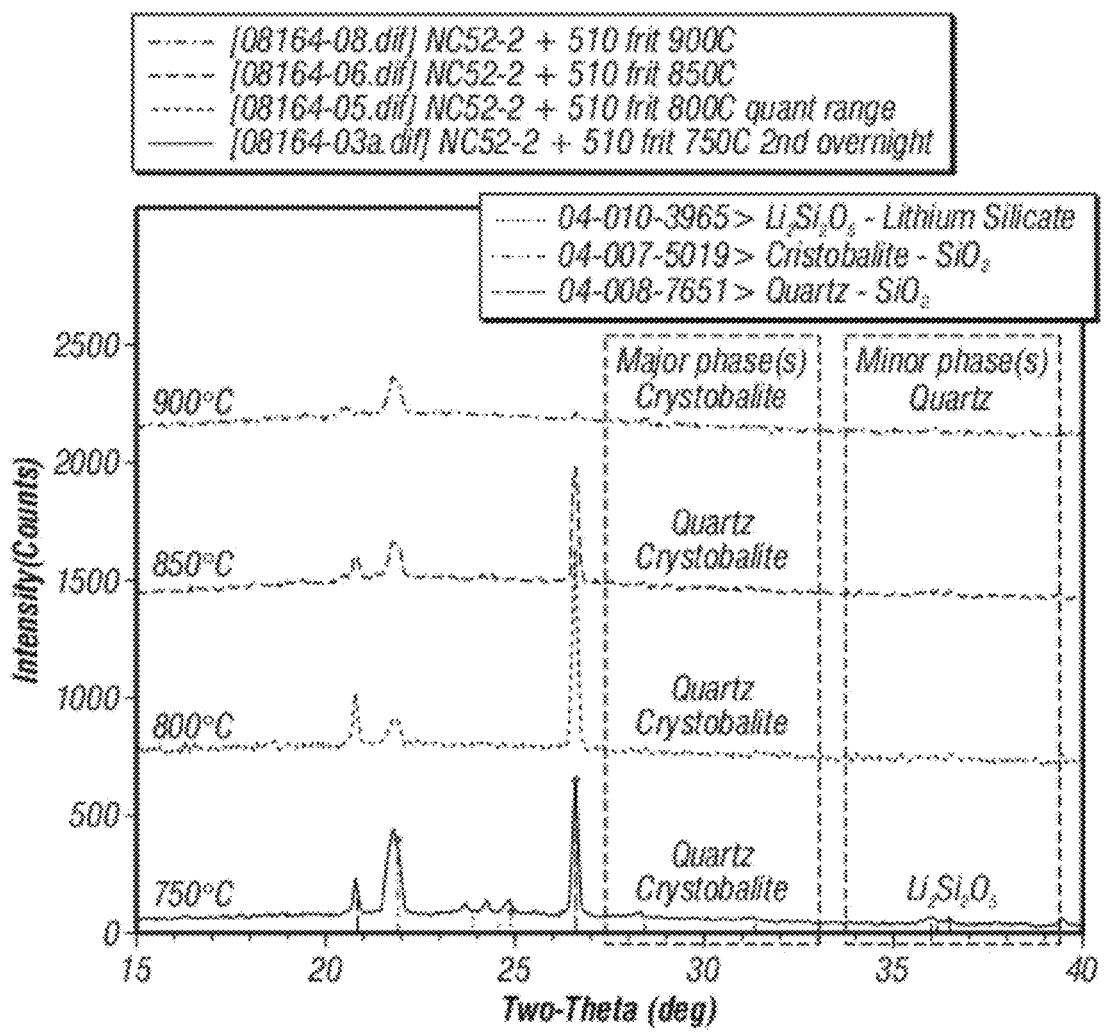
FIG. 4(a) shows XRD patterns of glass-ceramic waste forms showing the crystallinity change with increasing vitrification temperatures; quartz, crystoballite and lithium silicate occur in the 750° C. sample; these phases disappear at 900° C. as the amorphous phase becomes more and more predominant.
Figure 4B:
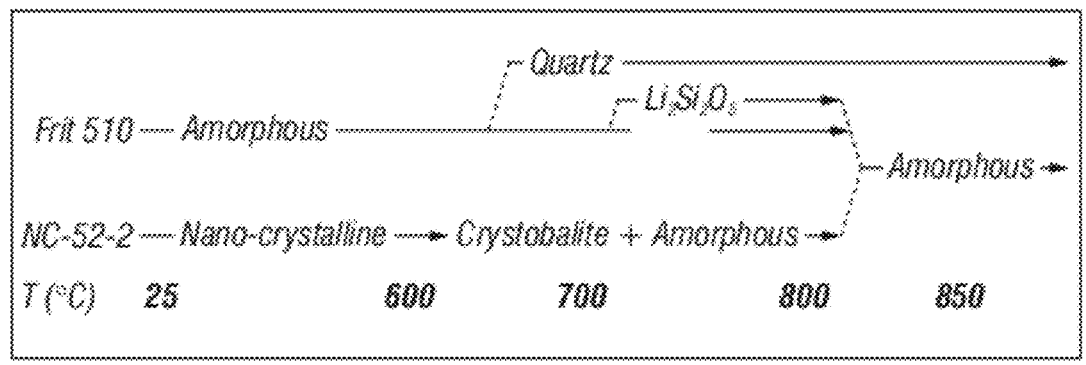
FIG. 4(b) is a schematic diagram of crystal phase changes occurring for 510 glass frit.

Microstructure analyses of glass-ceramic waste forms. A vitrification study using Ferro frit "510" and iodine-loaded mesoporous alumina was conducted. The vitrification was carried out at temperatures of about 750, 800, 850, and 900° C. for 30 minutes, respectively. The resulting materials were characterized with XRD (including HTXRD) and TEM. FIGS. 3(a)-3(d) show the morphology of the ceramic/glass mixtures. The increasing surface exposure in terms of the void space due to bubbling during vitrification matches the durability decreasing with increase in temperature The XRD patterns are shown in FIG. 4(a), which indicates the formation of $Li_2Si_2O_5$ mineral phase along with quartz, and cristobalite phase at 750° C. Further heating results in loss of $Li_2Si_2O_5$ and slow disappearance of quartz and cristobalite phases.

Highly efficient mesoporous alumina and its composites are preferred as the getter materials (adsorbents) to sequestrate highly mobile radionuclides including $^{129}$I. Again, the present invention is of a method to convert these getter materials into durable waste forms at relatively lower vitrification temperatures (and of the resulting waste forms). The resulting waste forms are glass-ceramic nanocomposite that can immobilize a wide range of radionuclides with high loading capacity.

Ferro frit "510" with iodine-loaded mesoporous alumina is preferred for the formation of glass-ceramic waste forms based on the batch leaching tests, which indicated that this embodiment results in the least iodine loss during leaching tests. Note that just for screening purpose (to accelerate the experiments) the leaching method used here involves rather aggressive physical and chemical conditions. Unlike the conventional method for glass durability test (using slab or cubic glass), the waste form was ground to the size of 250 μm (high exposed surface area) and a weak alkaline buffer solution (pH 8.5) was employed. For comparison, approximately the same temperature, duration, chemistry of initial solution, and size of the target materials were used for all leaching tests.

Figure 5A:
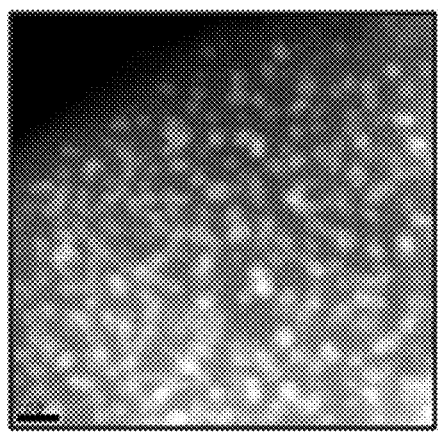
FIGS. 5(a)-5(c) show TEM images and EDS of a glass-ceramic waste form.
Figure 5B:
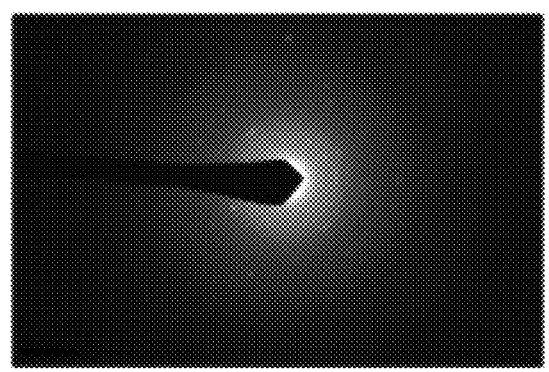
Figure 5C:
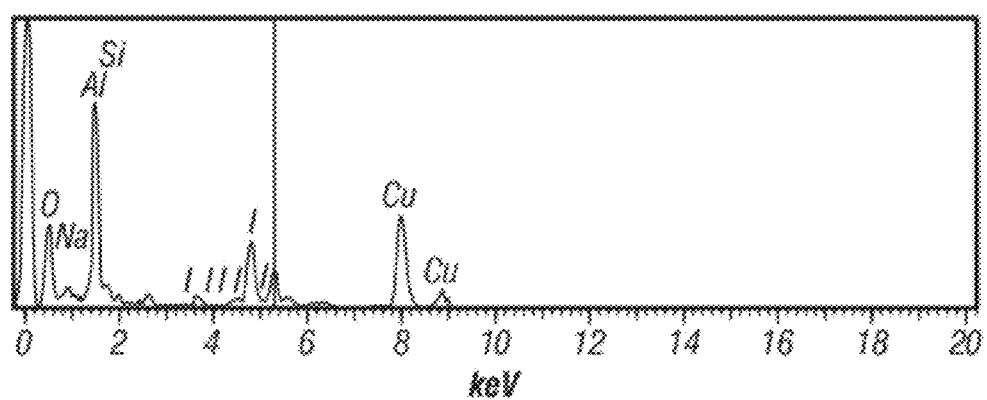
Figure 6:
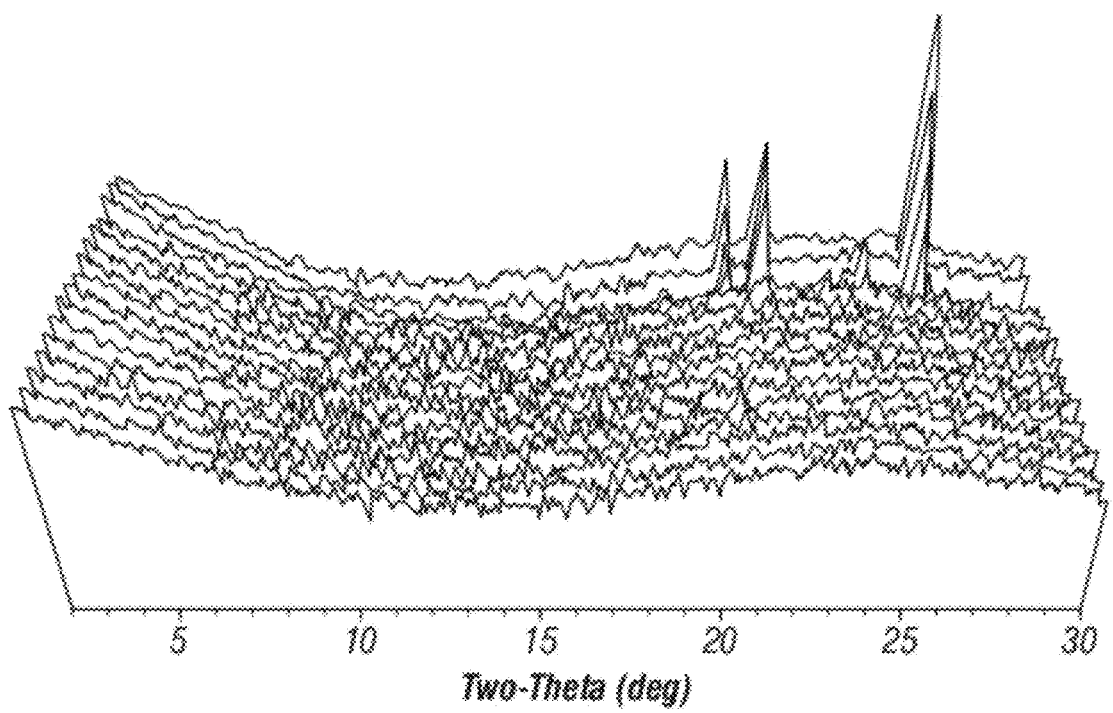
FIG. 6 shows HTXRD patterns of ceramic-glass forming mixtures; temperature was raised from room temperature 50° C. steps to 800° C. at 50° C./min.

The leaching rate of the waste form depends on the stability of both radionuclide-bearing nanocrytallites and their surround matrix. As shown in FIGS. 5(a)-5(c), iodine-bearing nanocrystals are embedded in an amorphous matrix. This is consistent with XRD analyses (FIGS. 4(a) and 6), which indicate that at a relatively low sintering temperature, e.g., between 750-800° C., several crystalline phases appear. The leaching test result indicates that glass-ceramic waste forms vitrified at 750° C. seem to have the lowest iodine loss during leaching. This may be due to the high content of crystalline quartz (possibly as the embedding matrix) as well as the presence of crystalline lithium silicate. Actually, in the case that the glass ceramic sample containing Ag, nanocrystals of AgI are observed to be embedded in crystalline quartz. At a higher vitrification temperature, iodine anions are expected to distribute more uniformly in the resulting waste form, probably "dissolved" in glass matrix.

High silica leaching rate for the lower temperature waste forms is directly related to the resulting solution pH. In these waste forms, Na is not completely incorporated into Al—Si—O frameworks. The preferential release of Na gives rise to the high solution pH.

For waste species other than iodine, such as technetium, it is anticipated that during the fixation process of the invention an oxyanionic species such as $TcO_4^-$ may also change its oxidative status to a less soluble reduced form, e.g., from $Tc(VII)O_4^-$ to $Tc(IV)O_2$.

Nanopore structures in an adsorbent play important role in radionuclide sequestration and encapsulation. As shown in Table 4, the presence of nanopores in the initial adsorbent material reduces iodine losses in subsequent fixation and vitrification processes.

TABLE 4

Enhancement of iodine retention by nanopore structures

| Material | I sorption (ppm) | % of lost during fixation | % of lost during vitrification |
|---|---|---|---|
| Regular alumina | 98 | Not tested | Not tested |
| Activated alumina | 8700 | 45 | 65 |
| Nanoporous alumina | 25000 | ~0 | ~0 |

To conclude, the present invention is of a method for the formation of nanostructured glass-ceramic waste forms that can be used for disposition of various radionuclides, especially iodine. This method is based on use of, preferably, mesoporous alumina and its derivatives as getter materials for entrapping gaseous iodine. In this method, iodine sorbed on mesoporous material is first reacted with sodium silicate to convert molecular iodine into less volatile ionic species. The resulting material is then vitrified with additional glass-forming components so that iodine forms nanometer precipitates that are encapsulated in either a glass or a crystalline matrix. The loss of iodine during vitrification is minimal (~0%). The preferred vitrification temperature range (850-950° C.) has been determined for the least iodine loss during a waste form leaching test. This temperature is lower than that generally used for glass formation. Specifically, the method reported here does not require using silver for immobilizing iodine, thus reducing the cost of waste form development.

Note that in the specification and claims, "about" or "approximately" means within ten percent (10%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of rendering hazardous materials less dangerous, the method comprising the steps of:
   sorbing a gaseous, molecular hazardous material in nanopores of a nanoporous material to form a sorbed, molecular hazardous material;
   fixing the sorbed, molecular hazardous material to the nanoporous material by reacting the sorbed, molecular hazardous material with an alkaline reagent or alkaline silicate to convert the sorbed, molecular hazardous material into a sorbed, anionic hazardous material;
   mixing the nanoporous material with glass-forming components excluding clay; and
   vitrifying the nanoporous material and glass-forming components to form a glass or crystalline matrix containing nanometer precipitates of the hazardous material.

2. The method of claim 1 wherein the nanoporous material comprises mesoporous alumina with pore sizes up to maximum of about 50 nm.

3. The method of claim 1 wherein the nanoporous material comprises derivatives of mesoporous alumina with pore sizes up to maximum of about 50 nm.

4. The method of claim 3 wherein the derivatives comprise one or more oxides of transition metals selected from the group consisting of silver (Ag), copper (Cu), iron (Fe), nickel (Ni), zinc (Zn), cobalt (Co), zirconium (Zr), and bismuth (Bi).

5. The method of claim 1 wherein the nanoporous material comprises one or more glass forming oxides.

6. The method of claim 5 wherein the glass-forming components comprise one or more glass forming oxides selected from the group consisting of $SiO_2$, $Na_2O$, $K_2O$, $CaO$, $MgO$, $B_2O_3$, $Li_2O$, and $P_2O_5$.

7. The method of claim 6 wherein the one or more glass forming oxides are in percentages by weight about 0-2% $Al_2O_3$, 12-15% $B_2O_3$, 7-9% $Li_2O$, 7-9% $Na_2O$, and 68-72% $SiO_2$.

8. The method of claim 1 wherein the hazardous material comprises a radionuclide.

9. The method of claim 8 wherein the hazardous material comprises one or multiple hazardous species in the form of gaseous or soluble ions.

10. The method of claim 9 wherein the hazardous species comprise one or both of $^{129}I$ and $^{99}Tc$.

11. The method of claim 1 wherein the vitrifying step occurs at a temperature lower than 1100° C.

12. The method of claim 1 wherein the vitrifying step occurs at a temperature between about 750 and 950° C.

13. The method of claim 1 wherein the vitrifying step occurs at a temperature between about 800 and 900° C.

14. The method of claim 1 wherein the vitrifying step occurs at a temperature between about 850 and 950° C.

15. The method of claim 1 additionally comprising conducting leaching tests to choose optimal compositions of matter for durability of the vitrified materials.

16. The method of claim 1 additionally comprising introducing compositions of matter that result in stable crystals.

17. The method of claim 16 wherein said compositions of matter comprise lithium oxide.

18. The method claim 1 wherein the fixing step comprises reacting the hazardous material with an alkaline metal hydroxide or alkaline metal salt.

19. The method of claim 18 wherein the fixing step comprises reacting the hazardous material with alkaline metal hydroxide.

20. The method of claim 1 wherein the fixing step comprises reacting the hazardous material with sodium or potassium silicate.

* * * * *